United States Patent

[11] 3,596,637

| [72] | Inventor | Esther J. Swafford<br>Rte 6, Crestland Court, Stone Mountain, Ga. 30083 |
|---|---|---|
| [21] | Appl. No. | 869,028 |
| [22] | Filed | Oct. 24, 1969 |
| [45] | Patented | Aug. 3, 1971 |

[54] ANIMAL BREEDING AND GROOMING BOX
7 Claims, 2 Drawing Figs.

| [52] | U.S. Cl. | 119/99, 119/103 |
|---|---|---|
| [51] | Int. Cl. | A01k 21/00, A61d 03/00 |
| [50] | Field of Search | 119/96, 98, 99, 103 |

[56] References Cited
UNITED STATES PATENTS

| 2,987,042 | 6/1961 | Rothberg | 119/103 |
|---|---|---|---|
| 3,130,709 | 4/1964 | Rothberg | 119/103 |
| 3,250,252 | 5/1966 | Leopold | 119/103 |

Primary Examiner—Aldrich F. Medbery
Attorney—Newton, Hopkins & Ormsby

ABSTRACT: This invention relates to an animal breeding and grooming box for use in the care of small domestic animals, such as dogs. More particularly, this invention includes a first animal support means adjustably mounted on a base support structure with means for securing an animal in place on the first support means. A second animal support means is adjustably mounted on the base support structure adjacent one edge and beneath the first animal support means.

PATENTED AUG 3 1971  3,596,637

INVENTOR
ESTHER J. SWAFFORD

Newton, Hopkins, & Ormsby
ATTORNEYS

ANIMAL BREEDING AND GROOMING BOX

BACKGROUND OF THE INVENTION

The breeding and care of small domestic animals have in the past presented a problem in that the animals being cared for often become frightened causing them to rigorously object the person caring for them. Also, the breeding of domestic animals often presented a problem, especially when one of the animals is hampered by a physical defect and when there is a difference in size between the two animals being bred.

There have been numerous attempts to make special animal support tables and platforms for use in the care of small domestic animals. However, most of these devices were complicated structures, expensive to manufacture and unreliable in their use. Further, none of these devices are designed for use both in the care of small animals and for improving the breeding capabilities of such animals.

SUMMARY OF THE INVENTION

It is therefore a primary object of this invention to provide an animal support device capable of supporting an animal in a position to be either cared for or in a position for breeding.

It is a further object of this invention to provide an animal support device which includes a first and second animal supporting surfaces.

It is a still further object of this invention to provide an animal supporting device which includes two animal supporting surfaces mounted for adjustment relative to each other.

An additional object of this invention is to provide an animal supporting device simple in construction and use, economical to manufacture, and reliable in operation.

Still other objects and advantages in the details of construction will become apparent after reading the accompanying description of one illustrative embodiment of the invention with reference to the attached drawings wherein like reference characters have been used to refer to like parts throughout the figures of drawings, and wherein:

BRIEF DESCRIPTION OF THE FIGURES OF DRAWINGS

DESCRIPTION OF THE ILLUSTRATIVE EMBODIMENT

Figure 1:
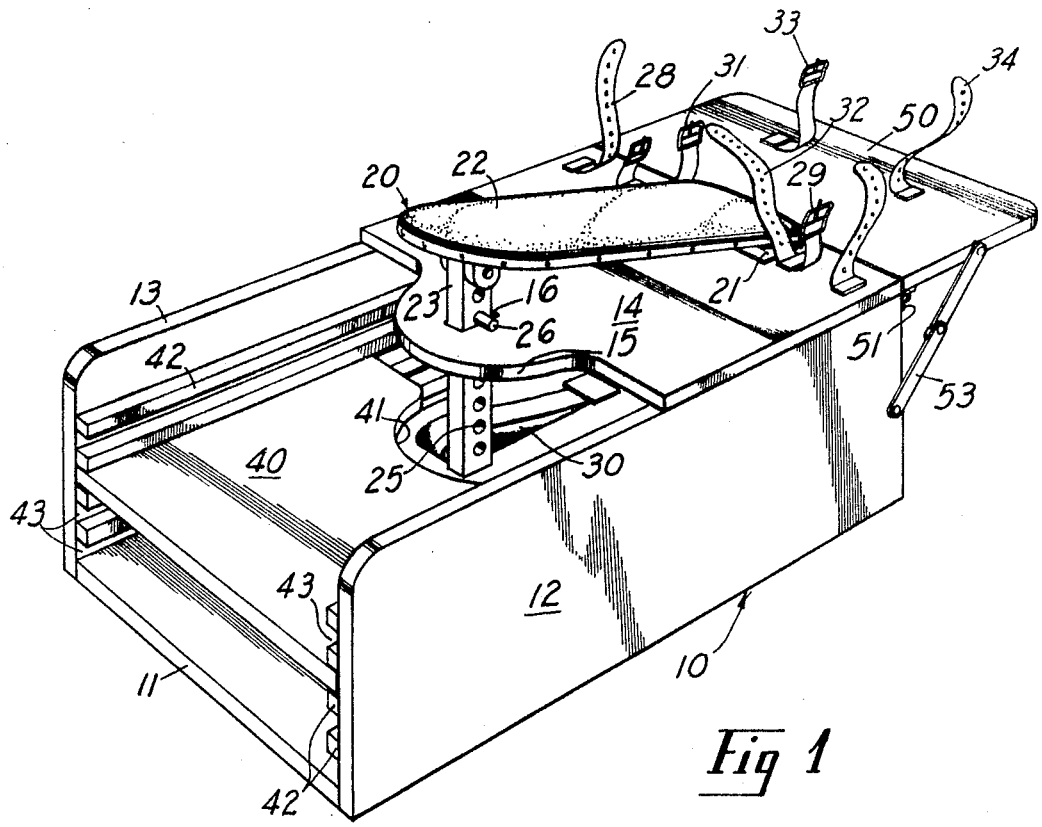
FIG. 1 is a perspective view of the breeding and grooming box.

Referring now to the drawings, the animal breeding and grooming box will be described with reference to a base support structure 10, a first animal supporting means 20, a second animal supporting means 40, and a support shelf 50.

As shown in FIG. 1, the base support structure 10 includes an elongated substantially rectangular body having a supporting base 11. Connected to the base 11 along the two side edges are a pair of upstanding sidewall supports 12, 13. Supported across the top of sidewalls 12, 13 adjacent one end is a top support plate 14. The top plate 14 includes a semicircular-shaped projecting portion 15 having defined therein an opening 16. The end of the base support structure adjacent the top plate 14 is enclosed by an end member 17 provided for adding strength to the base structure.

A first animal support means 20 is pivotally mounted adjacent one end to the top support plate 14 by means of a hinge element 21. The first animal support means includes an elongated supporting surface 22. The elongated surface 22 is adjustably supported about hinge element 21 by means of an upright standard 23. Standard 23 is pivotally connected adjacent an end of the surface 22, opposite from the hinge element 21, by means of a bracket 24. The standard 23 includes a series of openings 25 and is adjustably supported within the top plate opening 16 by means of a retaining pin 26 inserted in a selected one of the openings 25.

The support surface 22 includes a padded portion 27 on the top side thereof for providing a yieldable support surface for an animal. The support surface 22 is detailed in design or shaped to contact and support the main torso of an animals body with a front and rear leg extended downward on each side of the surface 22. Each of the front legs of a supported animal is secured in place by means of a pair of adjustable strap means 28, 29. The rear legs of a supported animal extend downwardly, with one of the legs on each side of the top plate projecting portion 15, and the rear legs are secured in place by means of a pair of yieldable securing straps 30 (only one of which is shown.) An adjustable strap means 31, 32 is provided on the top plate 14 adjacent the hinge connection 21 for retaining the main body portion of an animal firmly in place on the surface 22. The adjustable support shelf 50 is provided with an adjustable strap means 33, 34 for engaging and retaining the neck of an animal.

As shown in FIG. 1, the second animal supporting surface includes an elongated flat plate member 40. Plate member 40 includes a semicircular notched portion 41 substantially complimentary to the shaped top plate projection 15. Plate 40 is adjustably supported between the sidewalls 12, 13 by means of a series of vertically spaced runners 42 detailed in spaced relationship to provide a plurality of guide supporting tracks 43 therebetween.

Figure 2:
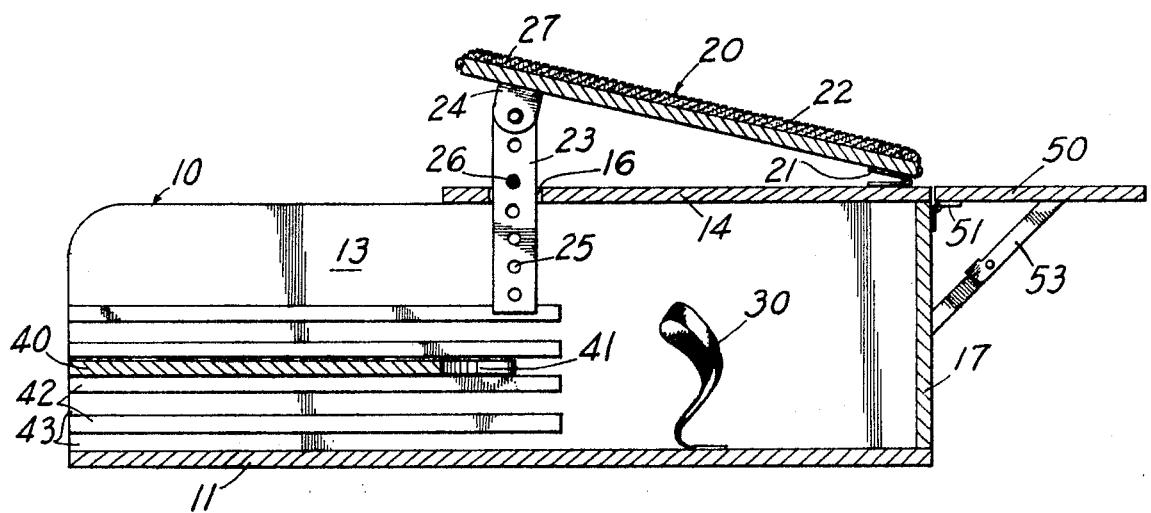
FIG. 2 is a vertical sectional view taken substantially longitudinally of the breeding and grooming box.

A support shelf 50 is pivotally mounted on the box adjacent an upper edge of end member 17 by means of a hinge element 51. Shelf 50 is adjustable between a support position as shown in FIGS. 1 and 2 and a collapsed position against the end wall 17. The shelf 50 is held in a supporting position by means of a pair of conventional latch-over-center brace members 52, 53 pivotally connected between sidewalls 12, 13 and side edges of shelf 50.

OPERATION

In the use of the combination box as a grooming support device, an animal to be cared for is placed on the first support surface 20 with one front leg and one rear leg extending downwardly on each side of the elongated support surface 22, with the padded surface 27 contacting and supporting the main torso of an animals body. An animal is retained in the above-described position by fastening the left front leg with strap means 28, the right front leg by strap means 29, the rear legs by the yieldable strap means 30, the main body portion by strap means 31, 32 and the neck of the animal by means of adjustable strap means 33, 34.

An animal could be supported on the second support surface 40 for a grooming operation, if it is not necessary to retain the animal in place and if it is essential to have the animals feet and legs free.

Adjustment of the first animal support surface is accomplished by removing the retaining pin 26, elevating the member 20 upwardly or downwardly about hinge element 21 to position the support surface to the desired height and then inserting pin 26 into the opening 25 located adjacent the top surface of top plate 14.

Adjustment of the second animal support means 40 is effected by removing plate 40 from the box by sliding the plate to the left (as shown in FIG. 2) until the front edge of the plate has cleared the rear of the runners 42. The plate 40 is then inserted into the box again along the selected runners 42.

In using the combination box as a breeding device, the female animal is placed on the first animal support means 20 as above described and retained in place by the leg retaining straps 28, 29 and 30. The male animal is then placed on the second animal support means 40. Now the first animal support means is adjusted as above described to bring the female into a correct supported position for breeding. If however, the range of adjustment of animal support 20 is not sufficient, the male animal can be removed from support 40 and support 40 can be adjusted accordingly, as above described.

It now becomes apparent that the above-described illustrative embodiment of the animal breeding and grooming box is capable of obtaining the above-stated objects and advantages. It is obvious that those skilled in the art may make modifications in the details of construction without departing from the spirit of the invention which is to be limited only by the scope of the appended claims.

What I claim is:

1. In an animal breeding and grooming box for use in the care and breeding of small domestic animals comprising, in combination:
   a. a base support structure;
   b. a first animal support surface, said first animal support surface shaped to contact and support the main torso of an animals body;
   c. means adjustably mounting said first animal support surface on a horizontal axis on said base structure for tilting movement relative to said base support;
   d. means on said first support surface for securing an animal thereto;
   e. a second animal support surface mounted on said base support at a lower elevation and adjacent to said first animal support surface, said second support surface defining a means to contact and support the feet of an animal; and
   f. means for adjustably mounting said second support surface vertically and slidable on said base structure adjacent one end of said first support surface.

2. In an animal breeding and grooming box as described in claim 1 further characterized in that said first animal support surface includes an elongated member designed to extend along the underside of the main torso of an animals body with one of the animals front and rear legs disposed on each side of said first surface.

3. In an animal breeding and grooming box as described in claim 1 further characterized in that said first support surface includes an elongated member pivotally connected adjacent one end to said base structure and including a standard connected adjacent an opposite end for supporting said opposite end for vertical adjustment about said pivoted connection.

4. In an animal breeding and grooming box as described in claim 1 further characterized in that said first support surface includes a padded upper supporting surface.

5. In an animal breeding and grooming box as described in claim 1 further characterized in that said second support surface includes an elongated member and wherein said base structure includes a series of vertically displaced support means for supporting said elongated member on a selected one of said vertically displaced support means.

6. In an animal breeding and grooming box as described in claim 1 further characterized in that said first support surface includes an elongated member having an extended rear edge which overlies a notched recess portion formed in the extended forward edge of said second support surface.

7. In an animal breeding and grooming box as described in claim 1 further characterized in that said base support structure includes a shelf support means adjacent a second end of said support surface pivotally connected adjacent one edge of said first support surface for adjustable movement from a supporting position.